United States Patent [19]

Luce et al.

[11] 4,265,498
[45] May 5, 1981

[54] THRUST BEARING

[75] Inventors: Carl T. Luce, Thousand Oaks; Edwin L. Banks, Jr., Lake View Terrace; Terrence P. Dowell, Van Nuys, all of Calif.

[73] Assignee: Barry Wright Corporation, Watertown, Mass.

[21] Appl. No.: 28,046

[22] Filed: Apr. 6, 1979

[51] Int. Cl.$^3$ ............................................. F16C 19/50
[52] U.S. Cl. ............................... 308/230; 308/DIG. 9
[58] Field of Search ......... 308/219, 230, 229, DIG. 8, 308/DIG. 9, 233, 227

[56] References Cited

U.S. PATENT DOCUMENTS

| 359,030 | 3/1887 | Peterson | 308/230 |
|---|---|---|---|
| 405,559 | 6/1889 | Johansson | 308/230 |
| 588,117 | 8/1897 | Springer | 308/230 |
| 867,426 | 10/1907 | Shields | 308/144 |
| 931,069 | 8/1909 | Larrabee | 308/230 |
| 1,059,313 | 4/1913 | Perkins | 308/230 |
| 2,216,726 | 10/1940 | Anderson | 308/230 |
| 2,752,210 | 6/1956 | Clark et al. | 308/DIG. 8 |
| 3,311,433 | 3/1967 | Graham et al. | 308/230 |
| 3,372,604 | 3/1968 | Perry | 308/230 |

Primary Examiner—Lenard A. Footland
Attorney, Agent, or Firm—Gary E. Ross; Milton E. Gilbert

[57] ABSTRACT

A thrust bearing adapted for high and low pressure loading for supporting an end of a shaft for rotation about its longitudinal axis comprising a ball bearing confined in concentric relation at the end of the shaft to be supported and a part recessed into the end of the shaft which rests against the ball bearing structured to dissipate heat and of a composition such that at high loads and high velocity, it functions as a solid lubricant and at low loads and low velocity, it functions as a solid.

10 Claims, 1 Drawing Figure

U.S. Patent    May 5, 1981    4,265,498
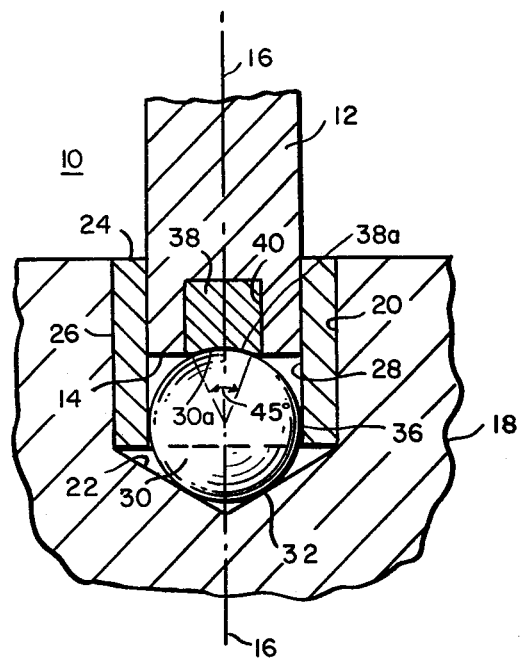

THRUST BEARING

BACKGROUND OF THE INVENTION

Thrust bearings are old in the art; however, insofar as is known, a thrust bearing which will function frictionlessly under both low and high loading is not available. Referring specifically to some of the known thrust bearing structures, Peterson U.S. Pat. No. 359,030 shows a shaft supported for rotation about a vertical axis on a ball bearing with a flat pellet of bronze interposed between the end of the shaft and the ball. The pellet is comprised of steel and an oil hole is provided in the support to supply oil to the bearing. Due to the thinness of the pellet and its small frictional contact with the ball, very little heat is developed and such heat as is developed is taken away by the oil.

Johansson U.S. Pat. No. 405,559 shows a structure wherein a shaft is supported for rotation about a vertical axis in engagement with a ball bearing so as to be slightly eccentric to the longitudinal axis of the shaft. An insert or plug is interposed between the end of the shaft and the ball bearing. The eccentricity of the insert constantly shifts the ball relative to the shaft so as to present new points to receive the wear.

Springer U.S. Pat. No. 588,117 shows a shaft supported for rotation about a vertical axis on a steel ball recessed into its lower end.

Shields U.S. Pat. No. 867,428 shows a shaft supported for rotation about a vertical axis resting on a ball bearing with a conical insert interposed between the shaft and the ball bearing.

Larrabee U.S. Pat. No. 931,069 shows a shaft supported for rotation about a vertical axis supported on a ball bearing comprised of hard rubber with a rubber insert interposed between the shaft and the ball bearing. Such a structure is limited in its load capacity.

Perkins U.S. Pat. No. 1,059,313 shows a shaft supported for rotation about a vertical axis on a ball bearing which is held tightly engaged to the shaft to cause the ball to rotate with the shaft.

Anderson U.S. Pat. No. 2,216,726 shows a shaft supported for rotation about a vertical axis resting on a ball bearing, the lower end of the shaft being provided with an annular recess to cause the ball to roll around the axis of the shaft as the shaft rotates.

While all of the aforesaid patents disclose broadly the concept of supporting a shaft for rotation about its longitudinal axis on a ball bearing, none of the bearings are designed or adapted to accommodate both low and high loading with an equal degree of frictionless support. It is the purpose of this invention to provide a low and high capacity thrust bearing which will function with equal efficiency under all conditions of loading.

SUMMARY OF THE INVENTION

As herein illustrated, the thrust bearing comprises a ball bearing confined in concentric relation with the end of the shaft to be supported thereby and an insert recessed into the end of the shaft which rests against the ball bearing characterized in that at high loads and velocities it functions as a solid lubricant and at low loads and velocities as a solid. The means for confining the shaft and ball in concentric relation comprises a support containing a hole for receiving the ball and the shaft. Desirably, the hole is cylindrical and of sufficient diameter to receive a sleeve having an inside diameter corresponding to the diameter of the shaft and of the ball. The bottom of the hole is conical. The insert which is recessed into the lower end of the shaft for engagement with the ball bearing is cylindrical, is located at the axis of the shaft and is structured to dissipate heat at the interfaces between it and the ball.

The invention will now be described in greater detail with reference to the accompanying drawing.

Referring to the drawing, there is shown a thrust bearing assembly 10 for supporting a shaft 12 at its lower end 14 for rotation of the shaft about its longitudinal axes 16—16. The thrust bearing assembly 10 is designed according to this invention to withstand wide variations in loading with equal efficiency at the low and high extremes of loading in contrast to such thrust bearings as are known in the prior art wherein, if designed to withstand high loads, drag at low loads and, if designed to operate frictionlessly at low loads, break down at high loads.

According to the design as illustrated, the assembly 10 comprises a support or housing 18 containing a cylindrical hole 20, the bottom 22 of which is conical. A sleeve 24 having an outside diameter 26 corresponding to the inside diameter of the hole 20 is placed within the hole 20 and is provided with an inside diameter 28 corresponding to and adapted to rotatably receive the lower end of the shaft 12. A ball bearing 30 is mounted in the opening 20 at the bottom so as to have tangential engagement at 32 with the conical bottom wall 22 and tangential engagement at 36 with the inside of the sleeve. An insert 38 is recessed into a cylindrical opening 40 at the lower end 14 of the shaft containing a recess 38a having a radius of curvature corresponding to that of a ball bearing for surface contact with a corresponding surface area 30a of the ball bearing 30. The surface of contact is the surface defined by a center angle of approximately 45°. In accordance with the invention, the insert is structured to dissipate heat, is cylindrical in cross section, has a diameter of approximately one-half the diameter of the shaft and corresponds substantially in axial length to its diameter. The size of the insert provides interfacial contact between it and the ball which promotes heat dissipation.

By way of example, the insert may comprise an alloy of:

Copper 89.0 to 94.0%
Aluminum 6.5 to 8.00%
Silicone 1.6 to 2.25%
Nickel 0.25 maximum
Tin 0.20 maximum
Total other 0.50 maximum The said composition has a melting point of approximately 1810° F. and a Rockwell hardness of B93 which is the equivalent of a Brinnel hardness of 200. The initial surface finish is not critical since the bearing material will conform to the ball bearing and assume the finish of the ball bearing. A surface finish of 63 or less is adequate. The ball bearing is steel and the sleeve is brass. The insert may be comprised of other alloys, for example, silver and silver lead bearing alloys.

It is within the scope of the invention to modify the dimensions given according to the loading required, the materials used, the rate of rotation and the environmental conditions expected to be encountered. As thus constructed, at low pressures, the bronze insert acts as a solid and has essentially frictionless contact with the ball bearing. At high pressures, the bronze insert functions as a solid liquid so as to have substantially frictionless contact with the ball bearing. Thus, under conditions of both low and high loading, frictionless contact is maintained between the lower end of the shaft and the ball bearing so as to provide substantially the same efficiency throughout the range of loading and velocity of rotation to which the structure is subjected.

While the assembly is structurally simple to manufacture, it embodies characteristics of efficiency and operativeness at both low and high pressures of the order of 150 to 1.

It should be understood that the present disclosure is for the purpose of illustration only and includes all modifications or improvements which fall within the scope of the appended claims.

We claim:

1. A thrust bearing assembly for an end of a shaft for supporting the shaft for rotation about its longitudinal axis comprising a ball bearing confined in concentric relation with the end of the shaft and a part recessed into the end of the shaft which rests against the ball bearing characterized in that the part at high pressure functions as a solid lubricant and at low pressures functions as a solid, thus maintaining substantially the same efficiency throughout the range of loading and velocity of rotation to which the structure is subjected, and wherein the part contains a recess having a radius of curvature corresponding to that of the ball bearing.

2. A thrust bearing assembly for an end of a shaft for supporting the shaft for rotation about its longitudinal axis comprising a support containing an opening for receiving the end of the shaft, said opening having a conical bottom, a ball bearing, means situated in the opening for holding the ball bearing concentric with respect to the axis of the shaft and an insert recessed into the end of the shaft having contact with the ball bearing which alternatively functions as a solid lubricant at high pressure and as a solid at low pressure, to thus maintain a substantially constant minimal frictional resistance throughout the range of loading and rate of rotation to which the structure is subjected.

3. A thrust bearing assembly according to claim 2 wherein the ball has tangential engagement with the conical bottom of the opening.

4. A thrust bearing assembly for an end of a shaft for supporting the shaft for rotation about its longitudinal axis comprising: a support containing an opening for receiving the end of the shaft; a ball bearing; means situated in the opening for holding the ball bearing concentric with respect to the axis of the shaft, wherein said holding means is a sleeve which has an outside diameter which fits within the opening in the support and an inside diameter corresponding to the diameter of the shaft and ball bearing; and an insert recessed into the end of the shaft having contact with the ball bearing which alternatively functions as a solid lubricant at high pressure and as a solid at low pressure, to thus maintain a substantially constant minimal frictional resistance throughout the range of loading and rate of rotation to which the structure is subjected.

5. A thrust bearing assembly according to claim 4 wherein the sleeve is brass.

6. A thrust bearing assembly according to claim 4 wherein the ball bearing has tangential engagement with the sleeve.

7. A thrust bearing assembly for an end of a shaft for supporting the shaft for rotation about its longitudinal axis, comprising:
   (a) a ball bearing disposed at the end of the shaft;
   (b) a part disposed between said end of the shaft and said ball bearing,
   (c) wherein said part contains a recess having a radius of curvature corresponding to that of the ball bearing, and
   (d) wherein the part comprises a material which at high pressures functions as a solid lubricant and at low pressures functions as a solid.

8. The thrust bearing assembly of claim 7 further including means for holding the ball bearing in concentric relation with the end of the shaft and in contact with said part.

9. A thrust bearing assembly for an end of a shaft for supporting the shaft for rotation about its longitudinal axis, comprising: a ball bearing; a support having an opening for receiving said ball bearing; a sleeve situated in the opening for maintaining the ball bearing in concentric relation with said shaft, said sleeve having an outside diameter which fits within the opening in the support and an inside diameter corresponding to the diameter of the ball bearing; and a part disposed between said ball bearing and said end of the shaft; said part comprising a material which functions as a solid lubricant at high pressures and as a solid at low pressures.

10. A thrust bearing assembly for an end of a shaft for supporting the shaft for rotation about its longitudinal axis, comprising:
   (a) a ball bearing disposed at the end of the shaft;
   (b) a part disposed between said end of the shaft and said ball bearing;
   (c) a sleeve having an inside diameter substantially equal to the diameter of the ball bearing, for holding said ball bearing in concentric relation to the shaft; and
   (d) wherein the part is confined between said shaft and said ball bearing and is comprised of an alloy material which at high pressures functions as a solid lubricant and at low pressures as a solid.

* * * * *